United States Patent [19]

Kim

[11] Patent Number: 5,786,878
[45] Date of Patent: Jul. 28, 1998

[54] METHOD OF MANUFACTURING A LIQUID CRYSTAL DISPLAY HAVING RANDOMLY DISTRIBUTED BIDIRECTIONAL SURFACE ORIENTATIONS

[75] Inventor: Wan Soo Kim, Kyungki-do, Rep. of Korea

[73] Assignee: LG Electronics Inc., Seoul, Rep. of Korea

[21] Appl. No.: 563,045

[22] Filed: Nov. 27, 1995

[51] Int. Cl.$^6$ .................................................. G02F 1/1337
[52] U.S. Cl. .............................. 349/126; 349/128; 349/129
[58] Field of Search ............................ 359/75, 76, 78; 428/1; 349/124, 125, 126, 128, 129, 187; 430/20

[56] References Cited

U.S. PATENT DOCUMENTS

| | | | |
|---|---|---|---|
| 5,172,255 | 12/1992 | Brosig et al. | 349/136 |
| 5,198,917 | 3/1993 | Togashi | 349/126 |
| 5,398,127 | 3/1995 | Kubota et al. | 359/75 |
| 5,434,687 | 7/1995 | Kawata et al. | 359/76 |
| 5,473,455 | 12/1995 | Koiko et al. | 359/76 |
| 5,486,403 | 1/1996 | Ishitaka et al. | 359/75 |

FOREIGN PATENT DOCUMENTS

| | | | |
|---|---|---|---|
| 6-222365 | 8/1994 | Japan | 349/126 |

*Primary Examiner*—William L. Sikes
*Assistant Examiner*—Tai V. Duong
*Attorney, Agent, or Firm*—Finnegan, Henderson, Farabow, Garrett & Dunner, L.L.P.

[57] ABSTRACT

A method of manufacturing a liquid crystal display includes the steps of coating an orientation layer on the surfaces of upper and lower substrates, respectively, performing a first rubbing on the surface of the orientation layers of the upper and lower substrates such that the orientation layer is formed in a predetermined direction, performing a second rubbing on the surfaces of orientation layers of the first and second substrates in the opposite direction to the first rubbing direction, and assembling the upper and lower substrates so that the rubbing directions of the substrates are substantially perpendicular.

8 Claims, 6 Drawing Sheets

RUBBING DIRECTION →

← RUBBING DIRECTION

F I G.5
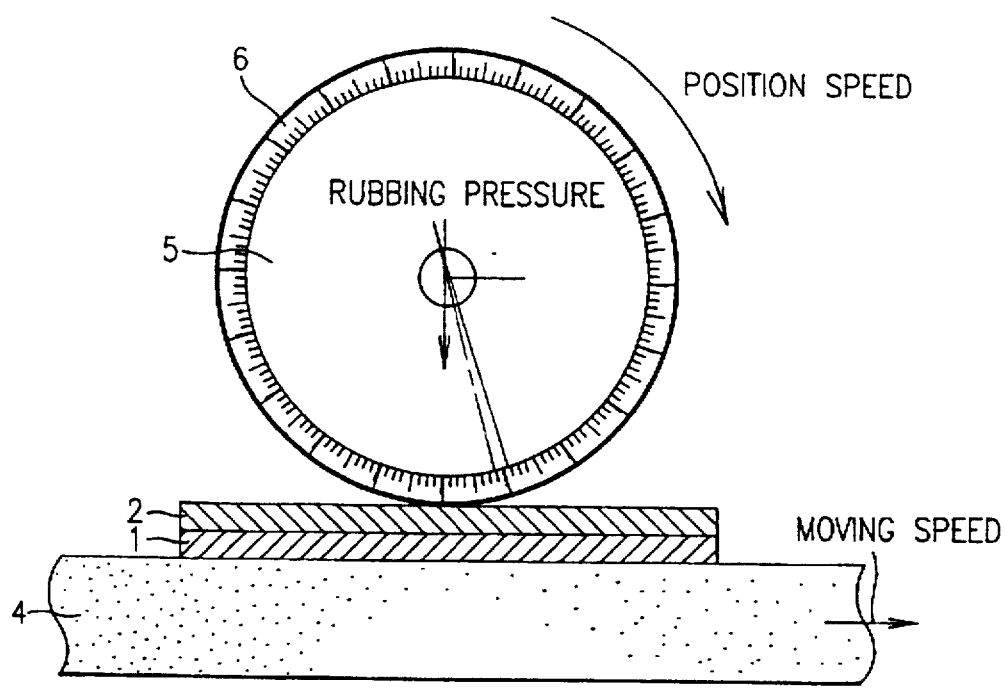
F I G.6
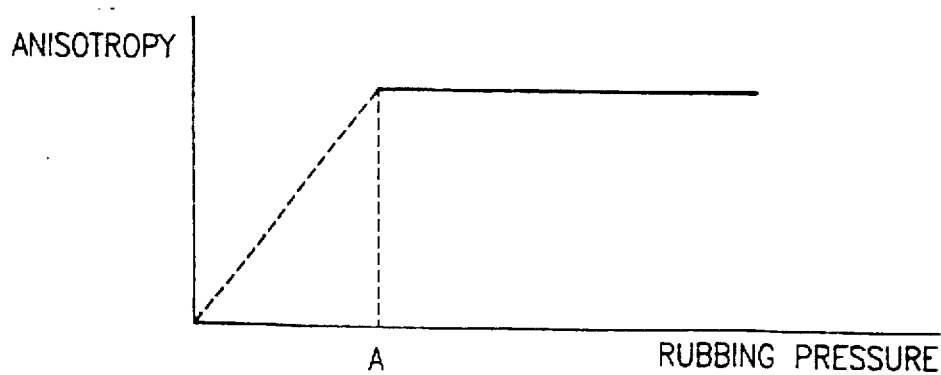

METHOD OF MANUFACTURING A LIQUID CRYSTAL DISPLAY HAVING RANDOMLY DISTRIBUTED BIDIRECTIONAL SURFACE ORIENTATIONS

BACKGROUND OF THE INVENTION

The present invention relates to a method of manufacturing a liquid crystal display and, more particularly, to a method of rubbing a liquid crystal display to widen the viewing angle of the liquid crystal display.

FIG. 1 is a plan view of a conventional four-domain liquid crystal cell. A method of forming and rubbing an orientation layer of a liquid crystal display in order to form a four-domain liquid crystal cell of FIG. 1 will be discussed below with reference to FIG. 2.

First, as shown in FIG. 2A, an orientation or alignment layer 2 is uniformly coated on a transparent electrode substrate 1. The orientation layer 2 is generally a polyamide or a polyimide layer. The resultant structure is then baked.

As shown in FIG. 2B, the overall surface of the substrate is then rubbed in one direction, creating surface orientations on the substrate in the direction of the rubbing.

As shown in FIG. 2C, photoresist 3 is then coated over the orientation layer 2. Then, as shown in FIG. 2D, the photoresist is selectively exposed and developed so that half of each unit pixel is covered by photoresist 3 and half of each pixel exposes the orientation.

As shown in FIG. 2E, the overall surface of the substrate is then rubbed in the opposite direction to the first rubbing direction, creating surface orientations on the exposed portion of the substrate in the direction of the rubbing. The photoresist is then removed as shown in FIG. 2F, leaving half of the orientation layer 2 with surface orientations in one direction and half of the orientation layer 2 with surface orientations in the opposite direction.

Upper and lower substrates are each created in this manner. The upper and lower substrates differ in that one substrate has an orientation layer 2 with its surface orientations orientated inward to face each other and the other substrate has an orientation layer 2 with its surface orientations oriented outward facing away from each other.

Upper and lower substrates, each being completely rubbed as described above, are joined for each pixel to form four domains, a, b, c, and d, each having different viewing angles. As shown in FIG. 1, among these four domains, two domains, b and c, are twisted right-handed. The remaining two domains, a and d, are twisted left-handed. A domain is twisted right-handed when the surface orientations of the lower domain are oriented 90° counterclockwise from the surface orientations of the upper domain. A domain is twisted left-handed when the surface orientations of the lower domain are oriented 90° clockwise from the surface orientations of the upper domain.

As shown in FIG. 1, each of the four domains a, b, c, and d of a unit pixel have a viewing angle dependency and an asymmetry of different electro-optical characteristics. Given that the four domains of a pixel together form one unit, the viewing angle dependency of pixel electro-optical characteristics is obtained by the sum of viewing angle dependencies of electro-optical characteristics of the respective four domains forming the pixel.

In other words, $T_{pixel}(V,\Theta,\Phi) = \frac{1}{4}[T_a(V,\Theta,\Phi) + T_b(V,\Theta,\Phi) + T_c(V,\Theta,\Phi) + T_d(V,\Theta,\Phi)]$. Here, $T_{pixel}$, $T_a$, $T_b$, $T_c$, and $T_d$ are transmittances of the pixel regions a, b, c, and d, respectively. V, $\Theta$ and $\Phi$ are an applied voltage, polar angle of the viewing angle, and azimuth angle of the viewing angle, respectively.

$T_a$, $T_b$, $T_c$, and $T_d$, individually, have strong asymmetries according to their own viewing angle. However, since $T_{pixel}$, defined by the sum of $T_a$, $T_b$, $T_c$, and $T_d$, has a moderated viewing angle, that is, a weakened asymmetry, because the strong asymmetry of each domain is offset when they are summed. This widens the range of viewing angles with a good contrast for the pixel.

The asymmetry removal of the viewing angle of the electro-optical characteristic of a four-domain twisted nematic (TN) liquid crystal cell according to the conventional technology allows for good viewing characteristics. However, as shown in FIG. 2, the forming of the substrate requires numerous steps (shown in FIGS. 2C–2F) and particularly requires the use of a photoresist 3. This makes the process of forming a TN liquid crystal cell complicated. Furthermore, this process requires very delicate operations in order to maintain the first surface orientation from the first rubbing step, despite the additional rubbing step. As a result, this increases the cost and complexity of the process.

SUMMARY OF THE INVENTION

Therefore, it is an object of the present invention to provide a simplified method of rubbing a liquid crystal display, to widen its viewing angle.

To accomplish the object of the present invention, there is provided a method of manufacturing a liquid crystal display comprising the steps of coating an orientation layer on the surfaces of upper and lower substrates; performing a first rubbing in a first direction on the surfaces of the upper and lower substrates on which the orientation layer is formed; performing a second rubbing on the overall surfaces of the upper and lower substrates in a second direction opposite to the first rubbing direction, and assembling the upper and lower substrates so that the first and second rubbing directions of the substrates are substantially perpendicular.

The objectives of the present invention are also achieved by providing a wide viewing angle liquid crystal display, comprising a first planar substrate having one surface at least partially covered with a plurality of first bidirectional orientations, and a second planar substrate having one surface at least partially covered with a plurality of second bidirectional orientations, said first and second substrates being oriented such that the first and second bidirectional orientations are parallel to form a gap therebetween, wherein the direction of orientation of the first bidirectional orientations is substantially perpendicular to the direction of orientation of the second bidirectional orientations, and the gap is filled with a liquid crystal material.

The invention also provides a method of increasing the viewing angle of a liquid crystal display having an opposed pair of substrates, the method including the steps of forming, on the surface of the first substrate, randomly distributed first bidirectional orientations sufficient to orient liquid crystal molecules in contact with the surface of the first substrate, forming, on the surface of the second substrate, randomly distributed second bidirectional orientations sufficient to orient liquid crystal molecules in contact with the surface of the second substrate, and orienting said first and second substrates to form the liquid crystal display with the direction of orientation of the first bidirectional orientations substantially perpendicular to the direction of orientation of the second bidirectional orientations.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE ATTACHED DRAWINGS

FIG. 1 is a plan view illustrating the structure of a conventional four-domain liquid crystal cell;

FIGS. 2A–2F sequentially illustrate a rubbing method for manufacturing a four-domain liquid crystal cell according to the prior art;

FIGS. 3A–3C sequentially illustrate a rubbing method for manufacturing a four-domain liquid crystal cell according to a preferred embodiment of the present invention;

FIG. 5 is a diagram of a device used for rubbing the orientation layer on the substrate according to a preferred embodiment of the present invention;

FIG. 6 is a graph of the anisotropy of the distribution of surface orientations on a rubbed layer versus the rubbing pressure using the device shown in FIG. 5;

DETAILED DESCRIPTION OF THE INVENTION

Hereinafter, a preferred embodiment of the present invention will be described with reference to the attached drawings.

Figure 1:
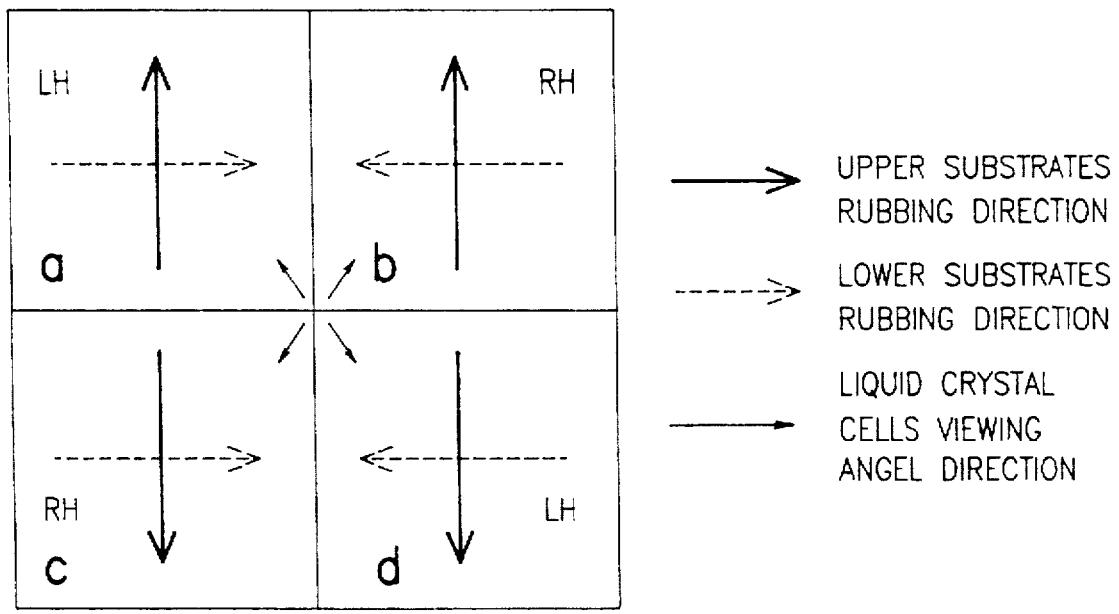
Figure 2A:
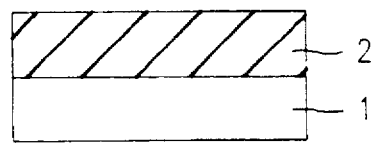
Figure 2B:
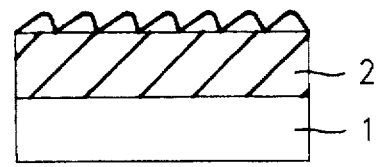
Figure 2C:
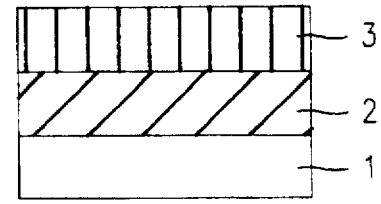
Figure 2D:
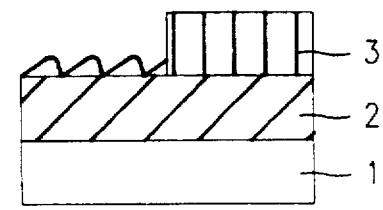
Figure 2E:
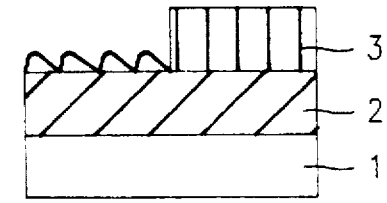
Figure 2F:
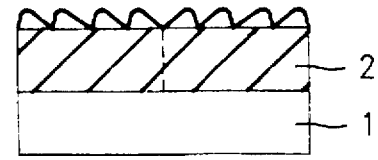
Figure 3A:
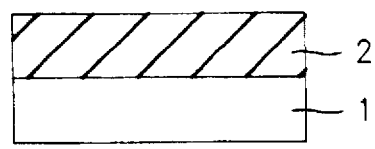

Referring to FIG. 3A, an orientation or alignment layer 2 is uniformly coated on a transparent electrode substrate layers 1. The resultant structure is then baked.

Figure 3B:
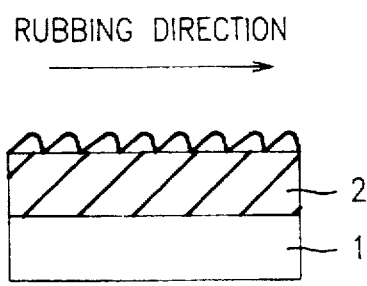
Figure 3C:
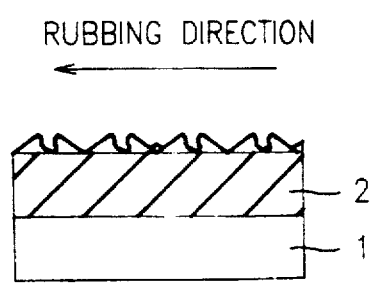
Figure 4A:
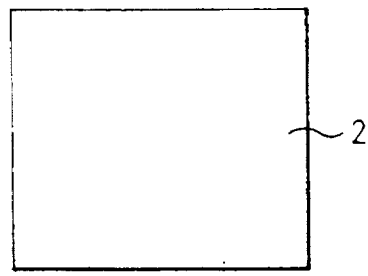
FIGS. 4A–4C are plan views providing respective sequential representations of the substrate in the cell shown in FIGS. 3A–3C.
Figure 4B:
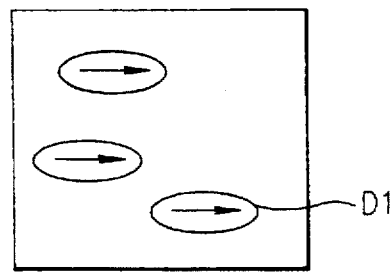
Figure 4C:
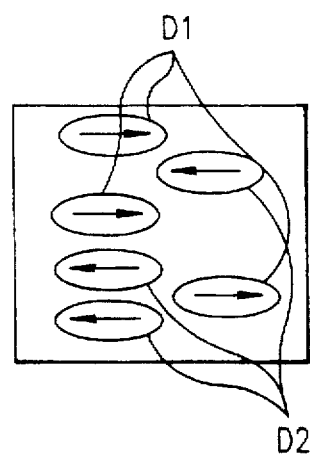

As shown in FIG. 3B, the surface of the orientation layer 2 is then rubbed in one direction. As shown in FIG. 3C, the surface of the orientation layer 2 is then rubbed in the opposite direction of the first rubbing direction. This results in randomly distributed bidirectional orientations on the surface of the orientation layer 2. FIGS. 4A, 4B and 4C are plan views of the substrate orientation layer 2 and respectively correspond to the elevational views in FIGS. 3A, 3B, and 3C. Reference numerals D1 and D2 indicate the directions of the surface orientations that are formed by rubbing in the opposite directions, i.e., the orienting directions of the liquid crystal.

As shown in FIG. 5, rubbing is preferably performed by placing the substrate 1 coated with orientation layer 2 on a stage 4, and moving the stage 4 under a rotating roller 5, the roller 5 being covered with a rubbing cloth 6. The roller 5 is pressed against orientation layer 2 with a predetermined rubbing pressure.

The anisotropy of the surface orientations is a measure of the amount of the orientation layer 2 randomly covered by the surface orientations. The anisotropy of the surface orientations on the orientation layer 2 depends upon the pressure of the roller 5. As shown in FIG. 6, the anisotropy of the surface orientations increases linearly with an increase in the rubbing pressure, until a saturation point A is reached after which the anisotropy of the surface orientations remains constant regardless of further increase in rubbing pressure.

Figure 7A:
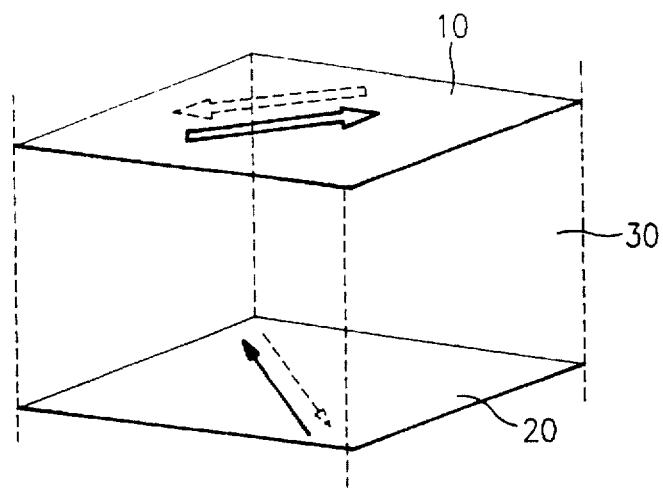
FIG. 7A shows structures of a four-domain liquid crystal cell of a preferred embodiment of the present invention and the principle of wide viewing angle achieved therein.

To form a four-domain liquid crystal pixel, an upper substrate 10 (including a substrate layer 1 and an orientation layer 2) and a lower substrate 20 (including a substrate layer 1 and an orientation layer 2) are each prepared by the above steps and assembled, with the orientation layers 2 facing each other, so that the rubbing directions of the upper substrate are perpendicular to the rubbing directions of the lower substrate, and a liquid crystal material is placed between the two substrates. This forms the liquid crystal cell structure shown in FIG. 7A. The thick arrows in FIG. 7A represent the bidirectional surface orientations of the upper substrate 10. The thin arrows in FIG. 7A represent the bidirectional surface orientations of the lower substrate 20.

Figure 7B:
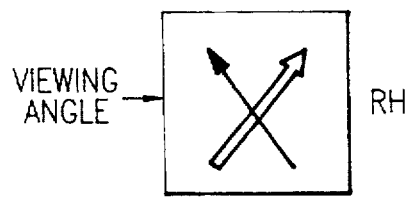
FIGS. 7B–7E show the four separate structures that make up the four-domain liquid crystal cell of FIG. 7A.
Figure 7C:
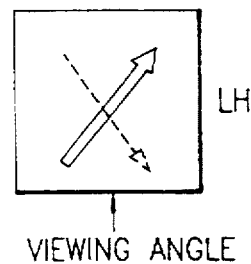
Figure 7D:
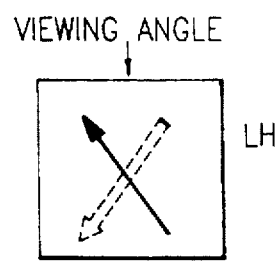
Figure 7E:
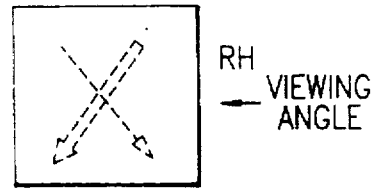

In each liquid crystal cell formed by the substrates 10 and 20, four liquid crystal orientation structures are formed by the rubbing steps, as shown in FIGS. 7B–7E. Each of the separate coexisting orientation structures, formed conceptually by taking one of the bidirectional orientations from each of the upper substrate 10 and the lower substrate 20, has a different viewing angle. Of the four liquid crystal orientation structures available, two structures, shown in FIGS. 7B and 7E, are twisted right-handed. The other two structures, shown in FIGS. 7C and 7D, are twisted left-handed.

In addition each of the four structures has a different viewing angle, dependent upon the relative directions of the surface orientations on the upper and lower substrates 10 and 20. The viewing angle of the entire cell is the average of the viewing angles of the four structures that make up the cell.

Since the probability of good viewing angles for the respective four liquid crystal orientation structures are the same due to the asymmetries, the asymmetry of the viewing angle of electro-optical characteristic is offset. In other words, domains having each of the four directional viewing angles oriented in the opposite directions are randomly distributed in fine sizes to thereby average the four available viewing angles. The probability of the four structures shown in FIGS. 7B–7E is the same, obtaining the electro-optical characteristic in which four domains are present and providing a wider range of good viewing angles.

In order to balance the liquid crystal orientation directions formed by the second rubbing and by the first rubbing, in forming the substrate of FIG. 3, the intensity of the first rubbing is established so that the anisotropy formed thereby is not saturated. The intensity of the second rubbing is also established so that anisotropy formed thereby is also not saturated. The intensity of the first rubbing, i.e., the pressure of the rubbing roller 5, may also be chosen to be greater than the intensity of the second rubbing. This insures that the distribution of the surface orientations is approximately equal in both directions.

As seen from the foregoing description, the present invention provides a method capable of manufacturing a four-domain liquid crystal cell that is simpler and, more cost effective than the conventional methods. When used in a liquid crystal display, the four-domain liquid crystal cell provides a widening of the viewing angle.

What is claimed is:

1. A liquid crystal display, comprising:

a first planar substrate having a surface at least partially covered with a plurality of first randomly distributed bidirectional surface orientations; and a second planar substrate having a surface at least partially covered with a plurality of second randomly distributed bidirectional surface orientations, said first and second substrates being oriented such that the first and second randomly distributed bidirectional surface orientations are in parallel spaced relation to form a gap therebetween, wherein the first bidirectional surface orientations are substantially perpendicular to the second bidirectional surface orientations, and the gap is filled with a liquid crystal material.

2. The liquid crystal display of claim 1, further comprising:

a first orientation layer over the first substrate; and a second orientation layer over the second substrate, wherein the first bidirectional surface orientations are on the first orientation layer and the second bidirectional surface orientations are on the second orientation layer.

3. A method of making a liquid crystal display having an opposed pair of substrates, said method including the steps of:

forming, on the first substrate, randomly distributed first bidirectional surface orientations sufficient to orient liquid crystal molecules in contact with the surface of the first substrate;

forming, on the second substrate, randomly distributed second bidirectional surface orientations sufficient to orient liquid crystal molecules in contact with the surface of the second substrate; and orienting said first and second substrates to form the liquid crystal display with the first bidirectional surface orientations substantially perpendicular to the second bidirectional surface orientations.

4. The method of claim 3, further comprising the steps of:

forming a first orientation layer over the first substrate; and forming a second orientation layer over the second substrate, wherein the first bidirectional orientations are formed on the first orientation layer and the second bidirectional orientations are formed on the second orientation layer.

5. The method of claim 3, wherein the steps of forming, on the surfaces of the first and second substrates, randomly distributed bidirectional orientations is performed by rubbing the substrate in a first direction and then in a second, opposite direction.

6. A method of making a liquid crystal display having an opposed pair of substrates, said method including the steps of:

forming on a first substrate, by rubbing the first substrate in a first direction and then in a second opposite direction, randomly distributed first bidirectional surface orientations sufficient to orient liquid crystal molecules in contact with the surface of the first substrate;

forming on a second substrate, by rubbing in said first and second directions, randomly distributed second bidirectional surface orientations sufficient to orient liquid crystal molecules in contact with the surface of the second substrate; and orienting said first and second substrates to form the liquid crystal display with the first bidirectional surface orientations substantially perpendicular to the second bidirectional surface orientations, wherein, for each of the first and second substrate, the intensity of the rubbing in the first direction is greater than the intensity of rubbing in the second direction.

7. A method of manufacturing a liquid crystal display comprising the steps of:

coating orientation layers on the overall surfaces of upper and lower substrates, respectively;

first rubbing the overall surfaces of the upper and lower substrates in a first direction;

second rubbing the overall surfaces of the upper and lower substrates in a second direction opposite to the first rubbing direction and forming randomly distributed bidirectional orientations on the overall surfaces of the upper and lower substrates; and assembling the upper and lower substrates so that the first and second rubbing directions are substantially perpendicular.

8. A method of manufacturing a liquid crystal display comprising the steps of:

coating orientation layers on the overall surfaces of upper and lower substrates, respectively;

first rubbing the overall surfaces of the upper and lower substrates in a first direction;

second rubbing the overall surfaces of the upper and lower substrates in a second direction opposite to the first direction and forming randomly distributed bidirectional orientations on the overall surfaces of the upper and lower substrates; and assembling the upper and lower substrates so that the first and second rubbing directions are substantially perpendicular, wherein the intensity of the first rubbing is greater than that of the second rubbing.

* * * * *